United States Patent [19]

Smith et al.

[11] 4,086,444
[45] Apr. 25, 1978

[54] DIAL PULSE KEY TELEPHONE INTERCOM SYSTEM

[75] Inventors: Maurice I. Smith, Woodinville; Victor M. DePinto, Bellevue, both of Wash.

[73] Assignee: Tone Commander Systems, Inc., Redmond, Wash.

[21] Appl. No.: 738,859

[22] Filed: Nov. 4, 1976

[51] Int. Cl.² .............................................. H04M 1/72
[52] U.S. Cl. .................................. 179/99; 179/18 AD
[58] Field of Search ................... 179/1 H, 18 AD, 37, 179/99

[56] References Cited

U.S. PATENT DOCUMENTS

| | | | |
|---|---|---|---|
| 3,014,097 | 12/1961 | Apt | 179/84 R |
| 3,668,331 | 6/1972 | Warner | 179/37 |
| 3,670,110 | 6/1972 | Warner | 179/37 |
| 3,725,594 | 4/1973 | Cartwright | 179/18 AD |
| 3,739,100 | 6/1973 | Cartwright | 179/18 AD |
| 3,909,551 | 9/1975 | Marshall | 179/99 |
| 3,941,944 | 3/1976 | McIntosh | 179/99 |
| 4,009,354 | 2/1977 | Champan | 179/99 |

Primary Examiner—Kathleen H. Claffy
Assistant Examiner—Randall P. Myers
Attorney, Agent, or Firm—Dowrey & Cross

[57] ABSTRACT

The system receives subscriber station address information in the form of dial pulses transmitted from a calling station along a common intercom circuit and selectively accesses a called subscriber station having a corresponding station address in order to produce a call indication ring-out thereat. The system includes a hook condition detector circuit which controls multiple system functions with respect to the on-hook and off-hook status of the calling station, and further includes a dial pulse detector circuit which effects additional control with respect to completion of dialing by the calling station. The system is suitable for use with ten or varying numbers of subscriber stations and may include, for applications having more than ten subscriber stations, appropriate transfer and associated output control circuitry for double digit operation.

10 Claims, 6 Drawing Figures

DIAL PULSE KEY TELEPHONE INTERCOM SYSTEM

BACKGROUND OF THE INVENTION

This invention relates to key telephone intercom systems and, more particularly, to pulse selective or dial pulse key telephone intercom systems.

Prior key telephone intercom systems for dial pulse of dial selective telephone application detect off-hook condition of the calling station within the intercom system, receive subscriber station address information in the form of dial pulses transmitted along a common intercom circuit from the calling station, and provide selective access to and actuate the ring-out device associated with a called station within the system. Station address information is registered by a dial pulse counter which is reset following or in response to ring-out or end of dialing, as the case may be. The various timing functions incident to off-hook determination, dialing, ring-out and, in those applications involving more than ten intercom stations, multiple-digit transfer, are performed by timing devices which heretofore have been constituted by complex relay controls and/or multiple timing circuits.

One system of this type, disclosed in U.S. Pat. No. 3,909,551, employs three timers to effect basic dial selective intercommunication among a ten station intercom, and, in applications involving greater numbers of stations, a fourth timing circuit to provide the transfer timing function. In addition to excessive complexity imposed by the use of multiple timing circuits, this system can retain a station address if the calling station is returned prematurely to its on-hook condition before it is reset at completion of dialing, hence accessing the wrong subscriber station on the basis of false station address information during the next call sequence. This system also tends to be uneconomical from the standpoint of installation of servicing because of fault detection or replacement incident to relay failure in the folded relay trees associated with the pulse counters, failure of merely one relay causing the entire ring-out circuit to shut down.

SUMMARY OF THE INVENTION

This invention provides a pulse selective key telephone communication system which overcomes or substantially mitigates these and other problems associated with prior dial pulse key telephone intercom systems. Simplified control circuitry detects digital logic signals transmitted from the calling station and maintains control of the system with respect to the off-hook status of the calling station, end of dialing by the calling station, and the on-hook status of the calling station. This control circuitry includes a single timing control circuit (hereinafter sometimes referred to as the "hook condition detection" circuit) for controlling multiple circuit functions with respect to the on-hook and off-hook status of the calling station, together with a second timing circuit (sometimes referred to herein as the "dial pulse detection" circuit) which controls output functions with respect to whether station address information transmission — usually by dial operation when off-hook — from the calling station has been completed. The hook condition detector circuit automatically resets the system whenever the calling station resumes the on-hook condition, even during or before completion of dialing, actuates appropriate visual indicating means which indicate that the intercom circuit is in use, and further enables the system in preparation for presentation of dial pulse information when the calling station initially assumes its off-hook condition. Incident to the latter function, this circuit still further prevents the system from registering false station address information during initial transition of the calling station from its on-hook to off-hook conditions.

According to one preferred embodiment of the invention, the dial pulse kay telephone system of this invention includes a plurality of dial telephone stations which are connected electrically by a common intercom circuit, each station including a respective call indicating means, preferably a ring-out device. Station address information in the form of dial pulses transmitted along the intercom circuit from the calling station, with the calling station in its off-hook condition, is received by appropriate input circuitry, and then is routed to the hook condition detector circuit. This circuit develops a first logic state indicative of off-hook status of the calling station a predetermined time after the calling station initially assumes that condition, and develops a second logic state indicative of on-hook status of the calling station a predetermined time after the calling station resumes on-hook status. An output circuit, which is responsive to the aforementioned logic states of the hook condition detector circuit, decodes the dial pulse information and operates the call signalling means respectively associated with the addressed called station for a predetermined time period. The preferred hook condition detector circuit includes a single timing capacitor which, in combination with appropriate digital logic elements, provide digital logic 1 envelope detection. The hook detector circuit effects automatic resetting of the output circuitry when the calling station resumes its on-hook condition (logic 0), and enables the decoder when the calling station initially assumes its off-hook condition (logic 1), the latter after a time delay sufficient to prevent registration of false station address information produced during the initial transition of the calling station from its on-hook to off-hook conditions. This circuit additionally controls and actuates appropriate indicators at each subscriber station which indicate that the intercom is in use whenever one subscriber station is off-hook. The output circuit additionally is reset following ring-out and, in applications involving more than ten subscribers stations, following receipt of dial pulses corresponding to the first so-called "transfer" digit.

The system further includes a dial pulse detector circuit which provides control of the output circuitry with respect to whether dialing is or is not in-progress at the calling station. The preferred dial pulse detector is generally similar to the hook detector circuit, except that it provides digital logic 0 envelope detection. According to further principles of the invention, the output circuit includes a dial pulse counter which preferably is constituted by a one-of-ten counter, the outputs of which drive respective output or ring-out relays for selective accessing of the called station ring-out device. For greater than ten station applications, the system further includes transfer circuitry which, in one preferred embodiment, is operated independently of the ring-out relays and, in a second preferred embodiment is operated in conjunction with the ring-out relays.

Thus, as will be appreciated from the foregoing summary, this invention provides a highly simplified yet versatile dial pulse key telephone intercom system in which a single timing circuit, the hook condition detector circuit, controls multiple system functions heretofore controlled by individual timing circuits. Only one additional timing circuit, the dial pulse detector circuit, is needed to provide acceptable system operation in many practical applications. Appropriate supplemental timing and/or control circuitry, of course, may be used to control supplemental system functions, such as ring-out or operation of the transfer delays (in applications involving more than ten stations).

This invention additionally is highly economical from the standpoint of installation and servicing. The one-of-ten dial pulse counter ensures that in the event one of the ring-out relays is, for some reason, inoperative, the remaining ring-out relays will remain operational. In this case, the service technician need only connect a supplemental relay with the appropriate ring-out connection and need not hunt down the inoperative or failed relay. Thus, down time or labor incident to installation or servicing of the system are, for this and other reasons, substantially minimized with highly economical results.

This invention further minimizes or substantially eliminates the likelihood of accessing the wrong subscriber station on the basis of false station address information. Although the pulse counter and associated output logic circuitry are reset, under normal conditions, following ring-out or receipt of dial pulses corresponding to a transfer digit, the hook condition detector circuit provides alternate resetting of the pulse counter and associated logic circuitry whenever the calling station resumes on-hook status. Consequently, if the calling station is returned to its on-hook status prematurely, the hook condition detector circuit ensures that the system will not retain a residual count during the next call sequence. The hook condition detector circuit further prevents false count registration when the calling station initially assumes off-hook status.

These and other features, objects and advantages of the invention will become apparent in the detailed description and claims to follow, taken in conjunction with the accompanying drawings in which like parts bear like reference numerals.

DETAILED DESCRIPTION OF THE DRAWINGS

Figure 1:
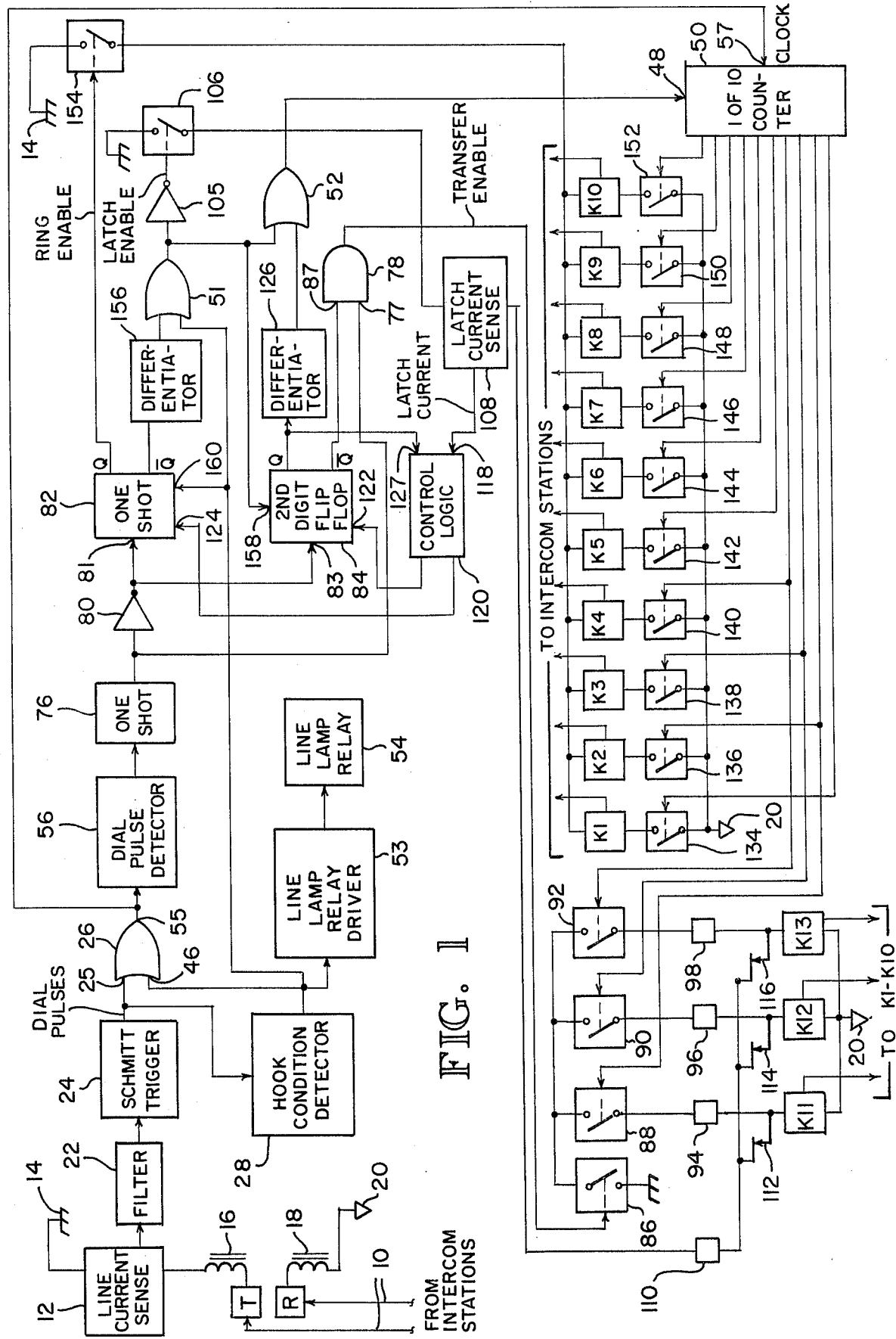
FIG. 1 is a schematic block diagram of the dial pulse key telephone intercom system of this invention.

The dial pulse key telephone intercom system of this invention is illustrated in schematic block diagram form in FIG. 1. Except as indicated hereinafter, the illustrated electrical circuits which make up the FIG. 1 system are of conventional design and may assume any of several forms, provided they perform the functions hereinafter described. The FIG. 1 system is connected at terminals T and R to a common intercom circuit (generally referenced by numeral 10) which electrically connects all subscriber telephone stations served by the FIG. 1 system. All stations having intercom service, therefore, are connected by generally similar terminals to the common intercom circuit for talking purposes so that the intercom circuit can be used by two, three or more stations at the same time, as the case may be. Each subscriber station includes a conventional dial telephone and an appropriate call signalling means, usually a ring-out device. The FIG. 1 circuitry provides selective access from one station (sometimes referred to herein as the "calling" station) to the call signalling means associated with another station (sometimes referred to herein as the "called" station). In order to initiate such selective accessing, the calling station is placed in its off-hook condition while the remaining subscriber stations are in their on-hook conditions, and then the appropriate digit or digits corresponding to the address of the called station are dialed. The FIG. 1 system receives the resultant station address information in the form of dial pulses which are routed from the calling station via circuit 10 and, in response to such information, selectively accesses and actuates the ring-out device associated with the called station, as will be described hereinafter.

Still referring to FIG. 1, a line current sense switch 12 is connected electrically with ground (referenced by numeral 14) and terminal T via feed coil 16. Terminal R is connected by feed coil 18 to negative talking battery (referenced by numeral 20). The switch 12 preferably is constituted by a single stage transistor switch of conventional design, although other types of switches may be used, if desired. Likewise, switches hereinafter mentioned in the description of FIG. 1 are constituted by generally similar single stage transistor switches, although other appropriate switches of known design may be used.

When one of the subscribers stations associated with the circuit 10 assumes its off-hook condition with the remaining stations on-hook, or during contact make intervals while dialing is effected at the calling station, switch 12 causes a high voltage level (logic 1) to be established at the input of filter circuit 22. When all subscriber stations are on-hook, or during contact break intervals, switch 12 causes a low voltage level (logic 0) to be established at the input of circuit 22. This circuit filters out noise caused by contact bounce during dialing and maintains voltage swing within an acceptable range. A schmitt trigger circuit 24 receives the signal which appears at the output of circuit 22, squares that signal, and effects additional noise rejection by hysteresis. The signal which appears at the output of circuit 24 during dialing (see curve a, FIG. 4), therefore, is composed of a square wave having alternate high voltage (logic 1) and low voltage (logic 0) levels — logic 1 corresponding to contact make and logic 0 corresponding to contact break. This signal is routed to input 25 of a control gate 26 of the logic OR type, and is further routed to the input of a hook condition detector circuit 28. In the illustrated example, the circuit 28 is a digital logic 1 envelope detector which develops a stable logic 0 signal commencing a predetermined time period (referenced by $t_1$ in curve b, FIG. 4) after the calling station assumes its off-hook condition, and maintains that logic signal until termination of a predetermined time period (referenced by $t_2$ in curve b, FIG. 4) after the calling station resumes on-hook status. When all subscriber telephones are on-hook, the circuit 28 develops a logic 1 (refer again to curve b, FIG. 4). Circuit 28 thus effectively ignores dial pulses so that its output is an indication of hook condition of the calling station.

Figure 2:
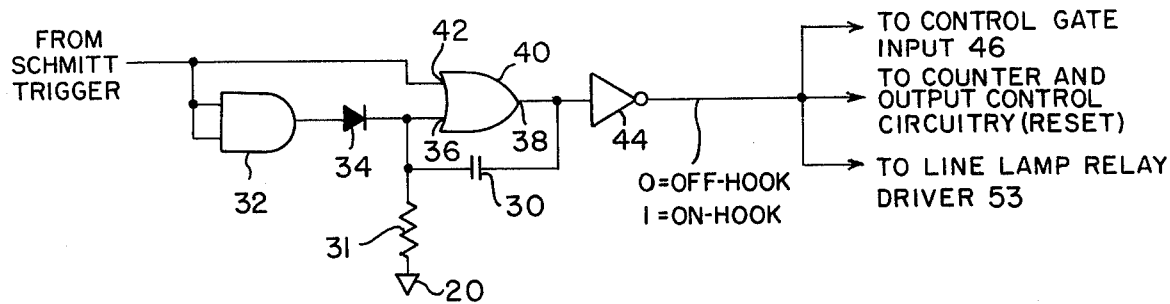
FIG. 2 is an electrical circuit schematic of the FIG. 1 hook condition detector circuit.

The hook condition detector circuit is illustrated in additional detail in FIG. 2. Referring now in particular to FIG. 2, the hook condition detector circuit includes a capacitor 30, AND gate 32, diode 34, OR gate 40 and inverter 44. Both inputs of gate 32 are connected together, as shown (FIG. 2), so that gate 32 acts as a buffer. Capacitor 30 is connected between one input (referenced by numeral 36) and the output (referenced by numeral 38) of OR gate 40. The other input (referenced by numeral 42) of gate 40 is connected with and receives dial pulses from circuit 24. The signal which appears at gate output 38 is routed to the inverter 44, the output of which constitutes the output of the FIG. 2 circuit.

Figure 4:
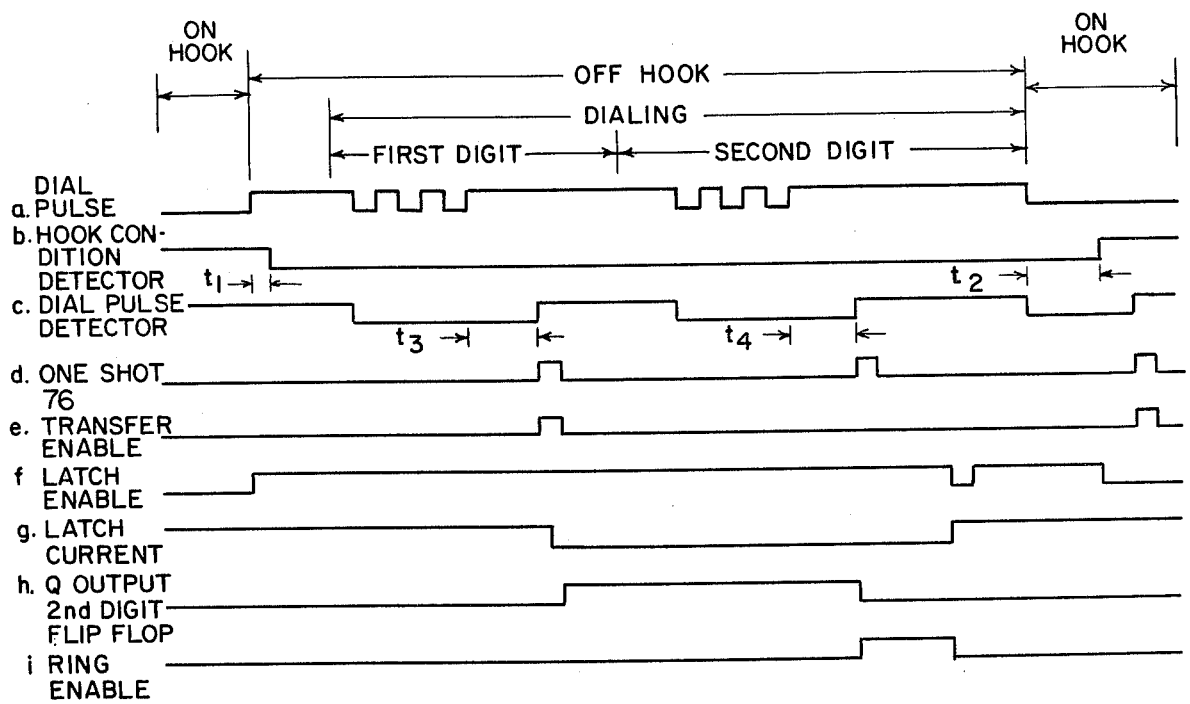
FIG. 4 is a timing diagram depicting operation of the FIG. 1 system.

In the on-hook condition, the FIG. 2 circuit output constitutes a logic 1, and in the off-hook condition a logic 0, even during dialing, as depicted in FIG. 4, curve b. With the calling station off-hook, but before dialing is commenced, a logic 1 signal is applied to gate input 42 and a corresponding logic 1 signal appears at gate output 38. This logic signal then appears as a logic 0 signal at the output of inverter 44. During dialing, dial pulses are delivered from circuit 24 (FIG. 1) to the FIG. 2 circuit so that logic 1 (make) and logic 0 (break) signals are presented at gate input 42 in alternate sequence. During each contact make (logic 1), the signal which appears at gate output 38 will, of course, be a logic 1. During each contact break (logic 0), however, gate output 38 will remain logic 1 as long as the capacitor 30 holds gate input 36 at a voltage above the gate threshold level; therefore, during each contact break, capacitor 30 should not be allowed to discharge via resistor 31 to negative battery 20 to a level that causes gate input 36 to drop below the gate threshold level during dialing. (The terms "charge" and "discharge" may be understood as an increase and a reduction in absolute voltage across capacitor 30 respectively.) To this end, capacitor 30 and resistor 31 are selected to maintain the voltage at gate input 36 above the gate threshold level under conditions wherein gate input 42 is logic 0 for a predetermined time period greater than the maximum time interval during which a logic 0 input will be encountered. Referring to FIG. 4, the width of time period $t_2$ therefore should be substantially greater than the pulse width of each dial pulse. Once the calling station resumes on-hook status for a time period longer than this predetermined period, of course, capacitor 30 discharges sufficiently that the voltage at gate input 36 drops below the gate threshold voltage. The logic 0 signal which now appears at the gate output 36 is correspondingly presented as a logic 1 signal at the output of inverter 44.

Referring again to FIG. 1, the logic signal which appears at the output of the hook condition detector circuit 28 is routed simultaneously to input 46 of the control gate 26, to the reset input 48 of a 1-of-10 counter 50 via steering gates 51 and 52, and further to a line lamp relay driver circuit 53 which actuates appropriate line lamp indicators located at each subscriber station for indicating that intercom circuit 10 is in use. The counter 50 receives digital station address information in the form of dial pulses (see curve a, FIG. 4) from the output 55 of gate 26, depending upon the logic signal applied to gate input 46, as will be described. These pulses are routed to the clock input 57 of the counter, whereupon the counter decodes and registers a dial count indicative of a certain subscriber station address or, for greater than 10 station applications, a particular transfer digit, as the case may be. The counter then actuates appropriate relay circuitry to actuate the correct subscriber station call signalling device, as will be described presently.

The hook condition detector output signal which is routed via gates 51 and 52 constitutes a reset signal which resets the counter and output circuitry when the calling station resumes on-hook status, as will be described. This signal is further routed from the output of gate 51 through an inverter 105 to effect closure of (or render conductive) a latch switch 106. The inverter causes the logic 0 signal delivered by circuit 28 during off-hook conditions to be applied to switch 106 as a logic 1 latch enable signal (refer to curve f, FIG. 4). The purpose and operation of switch 106 are described hereinafter.

The hook condition detector circuit output signal which is routed to gate input 46 provides selective enablement of the counter 50 to prevent it from registering an incorrect station address when the calling station initially assumes its off-hook condition. That is, the hook condition detector circuit 28, in combination with the control gate 26, prevent the counter 50 from registering one count as the calling station is taken off-hook. More specifically, the voltage level which appears at the output of circuit 28 remains high (logic 1) for a predetermined time period $t_1$ after the calling station initially assumes its off-hook condition (see curve b, FIG. 4) because of propagation delay imposed by circuit 28 during initial charging of capacitor 30. It is only at the end of this time period that a logic 0 signal, indicative of off-hook status, is delivered from circuit 28 to gate input 46. Consequently, the output of gate 26 remains at logic 1 during this period, despite changes in voltage levels of the signals delivered from circuit 10 via circuits 12, 22, and 24. Upon expiration of this time period, corresponding to establishment of logic 0 at the output of circuit 28, the logic signals which appear at the output of gate 26 correspond to the signals delivered from the intercom circuit via circuits 12, 22 and 24 and thereupon are delivered to the counter clock input 57, as described previously.

The logic signals which appear at gate output 55 are further routed to a dial pulse detector circuit 56. This circuit is generally similar to the hook condition detector circuit 28, except that it develops opposite logic levels. In the illustrated example, circuit 56 is a digital logic 0 envelope detector which develops a logic 0 output signal during dialing and develops a logic 1 signal a predetermined time period after completion of dialing, and again after resumption of on-hook status (refer to curve c, FIG. 4). Logic state transition from 0 to 1 serves as an indication of completion of dialing which, as will be described presently, causes the FIG. 1 output circuitry to produce a ringout at the selected called station.

Figure 3:
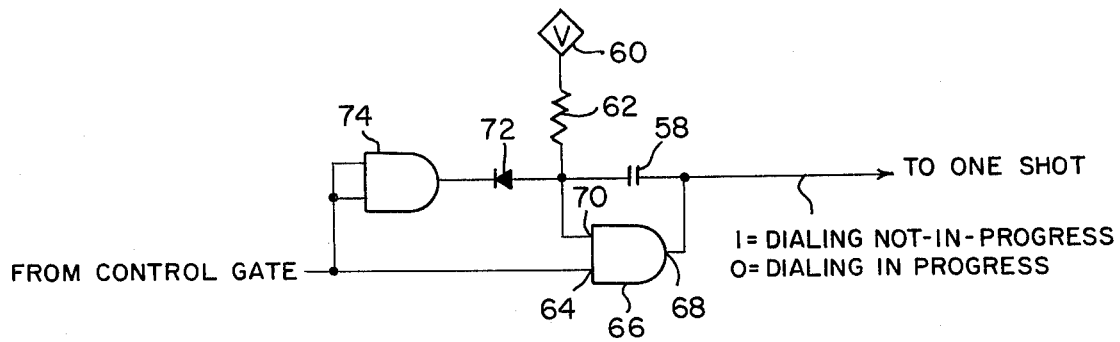
FIG. 3 is an electrical circuit schematic of the FIG. 1 dial pulse detector circuit.

Referring now in particular to FIG. 3, the dial pulse detector circuit includes a capacitor 58, AND gate 74, diode 72, and AND gate 66. As in the case of the FIG. 2 circuit, both inputs of gate 74 are connected together. Capacitor 58 is connected between the output 68 and input 70 of gate 66. Gate input 64 receives input signals from gate 26 of FIG. 1.

When the calling station assumes off-hook status, the absolute voltage across capacitor 58 remains unchanged and the output of the FIG. 3 circuit remains at logic 1. During dialing, capacitor 58 discharges via diode 72 and gate 74 during each contact break, and slowly charges from positive voltage source 60 via resistor 62 during each contact make. (The terms "charge" and "discharge" may again be understood as an increase and a reduction in absolute voltage across capacitor 58, respectively). During dialing, therefore, the signal which appears at gate output 68 will thus remain at logic 0 — even during subsequent make periods (logic 1) — as long as the capacitor 58 holds the voltage at input 70 below the gate threshold voltage; therefore, capacitor 58 should not be allowed to charge during each contact make to a voltage that will cause the voltage at gate input 70 to exceed the gate threshold voltage during dialing. To this end, capacitor 58 and resistor 62 are selected to maintain the voltage at gate input 70 below the gate threshold level for predetermined time periods $t_3$, $t_4$ after receipt of the last dial pulse (see curve c, FIG. 4). When the calling station is returned to on-hook status, a generally similar operation takes place, the FIG. 3 circuit output constituting a logic 0 for the aforementioned predetermined time period and then returning to logic 1 (refer again to curve c, FIG. 4).

Referring again to FIG. 1, the output of circuit 56 is delivered to a one-shot 76, which provides a pulse of sufficient duration to permit operation of control relays and related electro-mechanical elements associated with the FIG. 1 system. One-shot 76 operates in response to the 0 to 1 logic signal transition of circuit 56 a predetermined time after completion of dialing. This transition indicates completion of dialing. Note that one-shot 76 also produces a similar pulse when the calling station resumes on-hook status. The output of one-shot 76 (refer to curve d, FIG. 4) is routed directly to input 77 of an AND gate 78, and to the input of inverter 80. The output of inverter 80 is routed to input 81 of a second one-shot 82 which controls ring-out as will be described presently, and further is routed to input 83 of a flip-flop 84. If the first digit dialed is a so-called "transfer" digit (in those applications involving more than ten subscriber stations), the $\overline{Q}$ output of flip-flop 84 is applied to input 87 of gate 78 which causes that gate, due to the logic 1 signal already present at input 77 from one-shot 76, to produce a logic 1 output signal which corresponds in width to the output pulse produced by one-shot 76 (see curve 3, FIG. 4). This pulse is applied to and causes a transfer enable switch 86 to close, thereby establishing a current path through switch 86 and, in the illustrated example, one of three transfer switches 88, 90 and 92. These switches are actuated selectively by counter 50, corresponding to the transfer digit dialed, whereupon a completed current path is established through respective remote connectors 94, 96, and 98 to external transfer relays K11, K12 and K13, to negative battery 20. Counter 50 further operates output or ringout relays K1 – K10, as will be described presently. Relays K11, K12, K13 are of conventional multi-contact construction, the number of contacts corresponding to the number of subscriber stations in each group. Relays K1 – K10 are of single-contact construction. The transfer relays K11 – K13 control which group of subscriber stations will be accessed and relays K1 – K10 control which subscriber station will be accessed from the selected group. In the example illustrated in FIG. 1, three transfer relays are used with ten relays K1 – K10 for 36 intercom station service; in the example illustrated in FIG. 5, one transfer relay K11 is used with generally similar output relays for 19 intercom station service. The number of transfer and output relays used, of course, may vary, depending upon the number of subscriber stations and, in those applications involving less than ten subscriber stations, transfer relays are not needed.

Relays K11, K12 and K13 include respective latch contacts 112, 114 and 116. Operation of one relay therefore establishes a latch lead current path from ground through the now closed latch lead switch 106 (switch 106 closed previously in response to the logic signal routed from circuit 28 via gate 51 and inverter 105), a latch lead current sensing switch 108, remote connector 110, respective latch contacts 112, 114 or 116, to negative battery 20. In the example, the transfer relays are self-latching and will remain operated until the latch lead current path is interrupted, as will be described presently. The latch lead current sensing switch 108 now applies a logic 0 signal indicative of the presence of latch current to input 118 of a control logic circuit 120 during the pulse generated by one-shot 76 (refer to curve g, FIG. 4). Circuit 120 receives the latch current signal and applies appropriate logic signals to the control inputs 122 and 124 of the flip-flop 84 and the one-shot 82. The latter signal causes one-shot 82 to remain inoperative whereas the former signal causes the flip-flop to change state to yield a logic 1 at its Q output (see curve h, FIG. 4) at negative transition of one shot 76. This signal is received and converted by differentiater 126 into a positive going reset pulse which is routed by a steering gate 52 to the counter reset input. The counter therefore is now cleared in preparation for dialing of the second digit. The logic signal which thus appears at the Q output of flip-flop 84 further is routed directly to input 127 of circuit 120, thereby informing circuit 120 that the next digit received will be the second digit.

During dialing of the second digit, the counter 50 receives, decodes and registers dial pulse information, as described previously, and then operates the one access switch 134, 136, 138, 140, 142, 144, 146, 148, 150, 152, which corresponds to the digit dialed. (The counter 50 effected a similar operation with respect to switches 134-152 during dialing of the first digit; however, the ring-out circuitry associated with these switches was disabled during dialing of the first digit and is enabled only upon dialing of the second digit, as will be described presently). The one now closed access switch actuates the respectively associated output relay of K1 – K10. Upon completion of dialing the second digit, the one-shot 76 again generates a pulse; however, the transfer enable switch 86 at this time is inoperative because the $\overline{Q}$ output of flip-flop 84 is now in a logic 0 state, hence operation of an additional transfer relay is prevented. The control logic circuit 120 now applies an appropriate logic signal to one-shot input 124 to render the one-shot 82 operative so that, upon presentation of the logic signal transition from the dial pulse detector after completion of dialing, one-shot 76 delivers a pulse whose trailing edge triggers one-shot 82 which simultaneously delivers a logic 1 signal at its Q output and a logic 0 signal at its $\overline{Q}$ output. The logic 1 signal which appears at the $\overline{Q}$ output of one-shot 82 constitutes a ring enable signal (refer to curve i, FIG. 4), which is delivered to and closes (or renders conductive) a ring enable switch 154. This switch causes a current path to be established from ground 14 to negative battery 20 through the one now-closed output relay of K1 – K10.

The call signalling device associated with the addressed subscriber intercom station is thereupon accessed and operated via the closed output relay for the duration of the ring enable pulse generated by one-shot 82. At the end of ring-out, the logic 1 signal which appears at the Q output of one-shot 82 is delivered to a differentiater 156 which, in turn, produces an appropriate reset pulse which is routed by steering gates 51 and 52 to the counter reset input 48. This reset pulse is further routed to the flip-flop reset input 158. Consequently, counter 50 and flip-flop 84 are now reset for the next dialing sequence by the same or another subscriber station. The reset signal generated by differentiater 156 is further routed via the inverter 105 to the latch lead switch 106 and is applied thereto as a negative going pulse (refer again to curve f, FIG. 4). Switch 106 is thus opened to break the latch lead current path from ground via the transfer relays to negative battery, thereby opening the previously closed latch contact 112, 114, or 116. It will be recognized that one-shot 82 may be formed by combining appropriate flip-flop circuits to yield appropriate opposite logic level pulses simultaneously at two outputs.

In the event that the first digit dialed is not a transfer digit, the transfer enable switch 86 is turned on for the duration of the pulse delivered from one-shot 76; however, all transfer switches 88, 90 and 92 remain open so that the latch current sensing switch 108 fails to sense latch lead current and therefore fails to deliver the latch lead current sense signal to the control logic circuit 120. This circuit thus applies appropriate logic signals to the one-shot control input 124 to cause one-shot 82 to be triggered after dialing of the first digit at the end of the pulse delivered from one-shot 76. The designated output relay of K1 – K10 is thus operated at this time to access the addressed called status as described hereinabove. At the end of the ring-out period, the differentiater 156 causes the counter 50 to be reset — the flip-flop 84 still being in its initial condition — and causes the latch lead switch 106 to open as in the case of double-digit operation.

The hook condition detector circuit 28 provides automatic reset whenever the calling station resumes on-hook status, thereby preventing registration of false station addresses if the calling station is hung up prematurely. Still referring to FIG. 1, circuit 28 resets one-shot 82 when the calling station resumes on-hook status by applying a logic 1 signal to reset input 160 thereof. This signal is further routed by steering gate 51 to flip-flop reset input 158, and by steering gates 51 and 52 to the counter reset input 48. Consequently, if the calling station resumes on-hook status before operation of one-shot 82, or before completion of dialing a transfer digit, one-shot 82, flip-flop 84 and counter 50 will be reset by the reset signal routed from circuit 28 when the calling station resumes on-hook status. Of course, if dialing is completed as described hereinabove before the calling station is hung up, and or if one-shot 82 is operative at the time the calling station is hung up, only one-shot 82 need be reset by the signal routed from circuit 28. In these instances flip-flop 84 and counter 50 are reset by one-shot 82 as described herein at the end of ring-out, or when the calling station resumes on-hook status.

Figure 5:
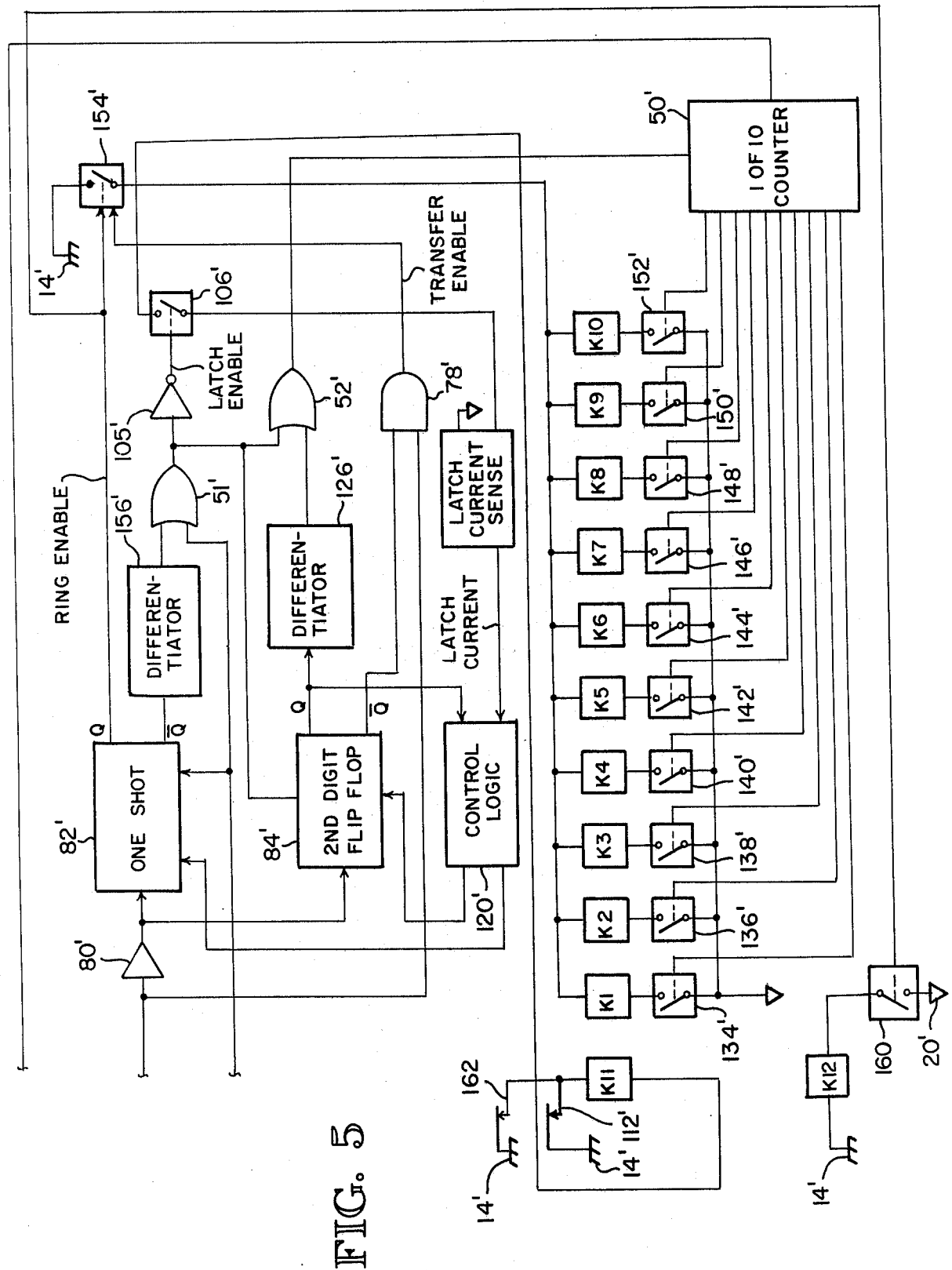
FIG. 5 is a schematic block diagram generally similar to FIG. 1 of a modified portion of the FIG. 1 system.

A second embodiment of the invention for 19 station service is depicted in schematic block diagram form in FIG. 5. The input circuitry, hook condition detector circuit, and dial pulse detector circuits of this embodiment are generally similar to the corresponding FIG. 1 circuits and are not shown. Like parts of the output circuitry illustrated in FIG. 5 are designated with the same reference numerals, primed. The FIG. 5 system includes modified relay circuitry (illustrated in additional detail in FIG. 6). This relay circuitry includes a transfer relay K11 in combination with a ring-out relay K12, both of which, unlike the FIG. 1 transfer relays, are incorporated into the basic circuit package. Consequently, the FIG. 1 remote connectors can be eliminated.

The illustrated FIG. 5 system operates in a manner generally similar to the FIG. 1 system, except that the transfer enable and ring enable signals both are applied to switch 154', thereby eliminating the FIG. 1 transfer enable switch (referenced in FIG. 1 by numberal 86). Consequently, a partial current path is established to all relays K1 – K10 simultaneously in response to operation of switch 154' upon presentation of the transfer enable or ring enable signals to switch 154'; however, ring-out takes place only upon presentation of the ring enable signal thereto. To this end, switch 160 establishes a completed current path from a source of ringing voltage 14' via ring-out relay K12 to negative battery 20' only upon presentation of the ring enable signal. Relays K1 – K10 are operated in response to actuation of relay K12 and therefore effect ring out as described hereinabove with respect to FIG. 1. Relay K11 and latch contact 112' likewise are operable as so described, except that the latch lead current path is established by momentary closure of contacts 162 associated with relay K2 in response to dialing of digit 2 — digit 2 thus constitutes a transfer digit. It will be recognized, of course that the FIG. 5 system could be modified for service with different numbers of subscriber stations and may be modified for 36 station service, for example, by the addition of appropriate transfer switches and relays.

Figure 6:
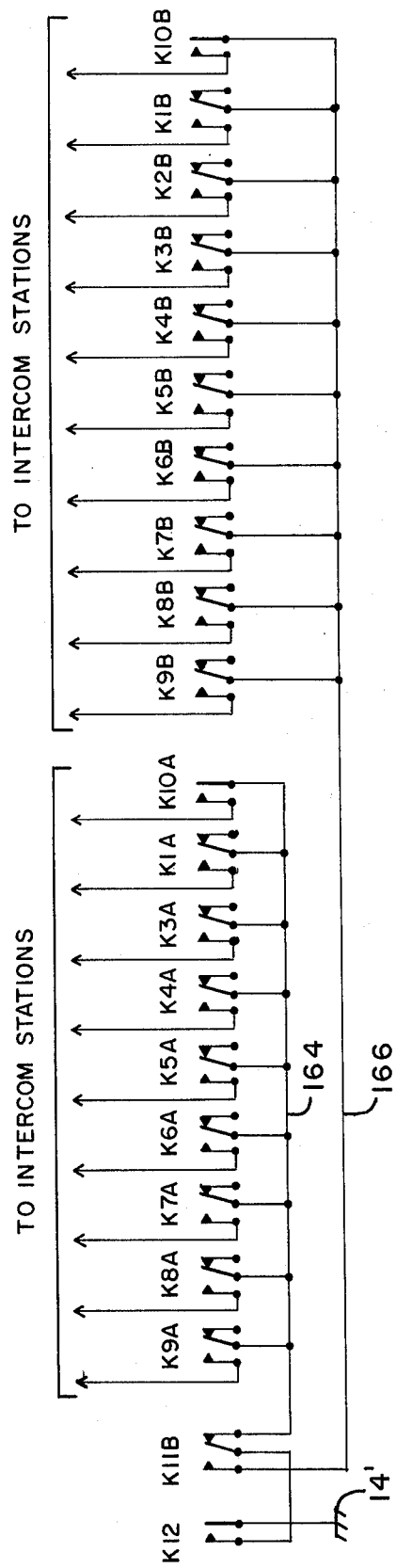
FIG. 6 is an electrical circuit schematic of the FIG. 5 relays in additional detail.

Referring now to FIG. 6, relay K12 is connected in series with ring-out voltage source 14'. Relays K1 – K10 are multi-contact relays, the contacts of which are divided into two groups (designated by suffix letters A and B) associated with respective groups of intercom stations. Relay K11 alternately connects the two contact groups with relay K12 via respective buses 164, 166, as shown (FIG. 6). For service with different numbers of subscriber stations, or course, the number of buses and contacts may be varied accordingly.

Although two preferred embodiments of the invention have been illustrated and described herein, variations will become apparent to one of ordinary skill in the art. Accordingly, the invention is not to be to the specific embodiments illustrated and described herein and the true scope and spirit of the invention are to be determined by reference to the appended claims.

The embodiments of the invention in which an exclusive property or privilege is claimed are defined as follows.

1. A pulse selective key telephone communication system, comprising: line current sensing means connected with an intercom circuit operatively associated with a group of subscriber stations, each having a dial telephone and intercom use indicator means, said line current sensing means being operative to sense signals transmitted via the intercom circuit from a calling station when off-hook; resettable pulse counter means for decoding decimal station address information in the form of dial pulse signals; resettable access means operatively associated with said pulse counter means for accessing a called station having a corresponding station address in order to produce a call indication thereat; reset means for resetting said pulse counter means and said access means upon completion of call indication; indicator control means for operating said intercom use indicator means; and a hook condition detector circuit including;

a gate having at least two inputs and an output, one input connected with said line current sensing means to receive signals therefrom, and means connected between the output and the second input for maintaining a predetermined input signal level at the second input commencing after receipt at the first input of a signal sensed by said line current sensing means as the calling station assumes off-hook status, and terminating after receipt at the first input of a signal sensed by said line current sensing means as the calling station resumes on-hook status, said predetermined input signal level being sufficient to cause said gate to present a first constant level output signal while said predetermined input signal level is maintained at the second input, said pulse counter means being operatively associated with the gate output such that it will be enabled to decode station address information only while said first constant level output signal is present at the gate output, and will be reset when said gate presents a second constant level output signal different from said first constant level output signal upon termination of said predetermined input signal level in the event the calling station resumes on-hook status before being reset by said reset means, said access means being operatively associated with the gate output such that it will be reset along with said pulse counter means in the event the calling station resumes on-hook status before being reset by said reset means, said indicator control means being operatively associated with the gate output such that it will be enabled to operate said intercom use indicator means only while said first constant level output signal is present at the gate output.

2. The system of claim 1, including means connected with said line current sensing means and said hook condition detector circuit for transmitting pulse signals from said line current sensing means to said pulse counter means only while said first constant level output signal is present at the gate output.

3. The system of claim 1, wherein said means for maintaining said predetermined input signal level include a single capacitor connected between the output and the second input, and means providing a charge path connected to said capacitor to effect such change in absolute voltage across said capacitor that said predetermined input signal level will be maintained at the second input until no signal is sensed by said line current sensing means for a predetermined time which exceeds the period of one dial pulse signal.

4. The system of claim 1, wherein said access means include latchable transfer relay means, and means operatively associated with the gate output for establishing a latch current path with respect to said transfer relay means while said first constant level output signal is maintained at the gate output.

5. The system of claim 1, including a dial pulse detector circuit comprising; a second gate having at least two inputs and an output, one input connected with said line current sensing means to receive signals therefrom, and second means connected between the output and the second input for maintaining a predetermined input signal level at the second input upon receipt at the first input of the first dial pulse signal sensed by said line current sensing means during dialing of a digit associated with a decimal station address at the calling station, and terminating after receipt at the first input of the last dial pulse signal associated with that digit, said predetermined input signal level being sufficient to cause said gate to present a first constant level output signal while said predetermined input signal is maintained at the second input thereof so that, upon termination of said predetermined input signal level at the second input, the output of said gate will change from said first constant level output signal to a second constant level output signal different therefrom, the transition of the gate output from said first constant level output signal to said second constant level output signal constituting an end-of-dialing signal.

6. The system of claim 5, wherein said second means for maintaining said predetermined input signal level include a single capacitor connected between the output and the second input, and means providing a charge path connected to said capacitor to effect such changes in absolute voltage across said capacitor that said predetermined input signal level will be maintained at the second input until no dial pulse signal is sensed by said line current sensing means for a predetermined time period.

7. The system of claim 5, including at least one transfer relay which includes latch contacts, a plurality of output relays, transfer enable switch means operative for establishing a transfer enable current path with respect to said transfer relay, latch enable switch means operative for establishing a latch current path with respect to said latch contacts, ring enable switch means operative for establishing a ring enable current path with respect to said output relays, said latch enable switch means being operatively associated with the output of the hook condition detector circuit gate for operation in response to presentation of said first constant level output signal, flip-flop means operatively associated with the output of the dial pulse detector circuit gate for alternatively operating said transfer enable switch means and resetting said pulse counter means in response to presentation of said completion-of-dialing signal, one-shot means operatively associated with the output of the dial pulse detector circuit gate for (1) operating said ring enable switch means, (2) resetting said pulse counter means and said flip-flop means, and (3) causing said latch enable switch means to become inoperative in response to presentation of a completion-of-dialing signal, and means responsive to the presence of latch current on said latch current path for causing said flip-flop means and said one-shot means to be triggered in response to presentation of a completion-of-dialing signal which corresponds to completion of dialing a transfer digit and a non-transfer digit, respectively, said flip-flop means and said one-shot means being so connected with the output of the hook condition detector circuit gate to be reset in response to transition from said first constant level output signal to said second constant level output signal.

8. The system of claim 5, including at least one transfer relay which includes latch contacts, a plurality of output relays, latch enable switch means operative for establishing a latch current path with respect to said latch contacts, ring enable switch means operative for establishing a ring enable current path with respect to said output relays, said latch enable switch means being operatively associated with the output of the hook condition detector circuit gate for operation in response to presentation of said first constant level output signal, flip-flop means operatively associated with the output of the dial pulse detector circuit gate for alternatively operating said ring enable switch means and resetting said pulse counter means in response to presentation of a completion-of-dialing signal, and one-shot means operatively associated with the output of the dial pulse detector circuit gate for (1) operating said ring enable switch means, (2) resetting said pulse counter means and said flip-flop means, and (3) causing said latch enable switch means to become inoperative in response to presentation of a completion-of-dialing signal, means responsive to the presence of latch current on said latch current path for causing said flip-flop means and said one-shot means to be triggered upon completion of dialing of a transfer and non-transfer digit, respectively, and disabling switch means for disabling said output relays during operation of said ring enable switch means by said flip-flop means and for enabling said output relays during operation of said ring enable switch means by said one-shot means, said flip-flop means and said one-shot means being so connected with the output of the hook condition detector circuit gate to be reset in response to transition from said first constant level output signal to said second constant level output signal.

9. A pulse selective key telephone communication system for use with an intercom circuit associated with a calling station and a called station, each having a dial telephone and intercom use indicator means, the system comprising: resettable pulse counter means for decoding station address information in the form of dial pulse signals transmitted via the intercom circuit from a calling station when off-hook; resettable access means operatively associated with said pulse counter means for accessing a called station having a corresponding station address in order to produce a call indication thereat; reset means for resetting said pulse counter means and said access means upon completion of call indication; indicator control means for operating the intercom use indicator means; pulse signal transmitting means operative for transmitting dial pulse signals from the intercom circuit to said pulse counter means; and a hook condition detector circuit adapted to receive signals from the intercom circuit independently of said pulse signal transmitting means, said hook condition detector circuit including means providing alternative constant level output signals for operating said pulse signal transmitting means such that it will transmit dial pulse signals from the intercom circuit to said pulse counter means commencing after the calling station assumes off-hook status and terminating after the calling station resumes on-hook status while simultaneously therewith operating said indicator control means such that it will be enabled to operate said intercom use indicator means, and for resetting said pulse counter means and said access means in the event the calling station resumes on-hook status before said pulse counter means and said access means are reset by said reset means.

10. The system of claim 9, wherein said access means include latchable transfer relay means, and means operative by said hook condition detector circuit for establishing a latch current path with respect to said transfer relay means while said pulse counter means and said indicator control means are operative.

* * * * *